US012338329B2

United States Patent
Xie et al.

(10) Patent No.: US 12,338,329 B2
(45) Date of Patent: Jun. 24, 2025

(54) METHOD FOR RECYCLING AND REUSING POLYURETHANE FOAM

(71) Applicant: ZHEJIANG UNIVERSITY, Zhejiang (CN)

(72) Inventors: Tao Xie, Hangzhou (CN); Ning Zheng, Hangzhou (CN); Zenghe Liu, Hangzhou (CN); Zizheng Fang, Hangzhou (CN); Qian Zhao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 849 days.

(21) Appl. No.: 17/562,972

(22) Filed: Dec. 27, 2021

(65) Prior Publication Data

US 2023/0002585 A1  Jan. 5, 2023

(30) Foreign Application Priority Data

Jun. 15, 2021 (CN) .......................... 202110660721.5

(51) Int. Cl.
  *C08J 11/28* (2006.01)
  *B33Y 70/00* (2020.01)
  (Continued)

(52) U.S. Cl.
  CPC .............. *C08J 11/28* (2013.01); *B33Y 70/00* (2014.12); *C09D 5/00* (2013.01); *C09D 175/04* (2013.01); *C08J 2375/04* (2013.01)

(58) Field of Classification Search
  CPC ....... C08J 11/26; C08J 2375/04; B33Y 70/00; C09D 8/00; C09D 175/04
  (Continued)

(56) References Cited

U.S. PATENT DOCUMENTS 9,732,026 B2 * 8/2017 Tabor ................. C08G 18/4288
12,037,424 B2 * 7/2024 Zhu ........................ C08F 220/20
(Continued)

FOREIGN PATENT DOCUMENTS

CN    108727550 A  * 11/2018
CN    111690169 A  *  9/2020  .............. C08J 11/16
(Continued)

OTHER PUBLICATIONS

Guillaume et al., Green & sustainable polyurethanes for advanced applications, J. Appl. Polym. Sci. 2017, DOI: 10.1002/APP.45646.
(Continued)

*Primary Examiner* — Michael M. Bernshteyn
(74) *Attorney, Agent, or Firm* — Jiwen Chen; Joywin IP Law PLLC

(57) ABSTRACT

The invention discloses a method for recycling and reusing polyurethane foam. The method includes: (1) The functionalized oligomers are obtained by adding solvent and catalyst to the polyurethane foam. (2) The functionalized oligomers are chemically modified, and the photosensitive group is introduced through the functional group reaction. The diluent, photoinitiator, and light absorber, etc. are introduced into the obtained oligomers to prepare photocurable resin. It can be used for photocurable coatings or 3D printing. This method has a fast reaction time, easy recovery of solvent and catalyst, higher value-added recycled product, good economic benefits, and social value.

10 Claims, 1 Drawing Sheet

(51) Int. Cl.
  *C09D 5/00* (2006.01)
  *C09D 175/04* (2006.01)
(58) Field of Classification Search
  USPC ........................................... 521/49.5
  See application file for complete search history.

(56) References Cited

U.S. PATENT DOCUMENTS

2015/0315325 A1* 11/2015 Tabor .................. C07C 67/03
                                              524/590
2022/0316573 A1* 10/2022 Von Lehmann ........ F16H 55/17

FOREIGN PATENT DOCUMENTS

CN         116438232 A  *  7/2023  ............ B41M 5/267
WO    WO-2019030071 A1  *  2/2019  ............ B29B 17/00

OTHER PUBLICATIONS

Gama et al., Polyurethane Foams: Past, Present, and Future; Material 2018, 11, 1841; doi: 10.3390/ma11101841 (35 pages).
Sheppard et al., Reprocessing Postconsumer Polyurethane Foam Carbamate Exchange Catalysis abd Twin-Screw Extrusion ACS Central Science, Jan. 2020 (7 pages).

* cited by examiner

METHOD FOR RECYCLING AND REUSING POLYURETHANE FOAM

This application claims priority to Chinese Patent Applications No. 2021106607215 filed Jun. 15, 2021, which is hereby incorporated by reference.

BACKGROUND OF THE INVENTION

1. Technical Field

The present invention relates to the field of recycling and processing of polyurethane foam, and particularly relates to the method of recycling and reusing thermoset polyurethane foam waste into a high value-added photocurable resin.

2. Description of Related Art

Polyurethane has a versatile structural design and tunable performance that is usually used as foam, elastomer, coating, adhesive, synthetic leather, fiber, etc. As an important synthetic material, it is widely used in many fields such as aerospace, construction, transportation, medical, and textile. According to previous reports, the global annual output of polyurethane in 2016 has reached 18 million tons. It is expected that the annual output will exceed 26 million tons by 2021, and the corresponding value will exceed 79 billion US dollars. Amongst, polyurethane foam, as an important product, accounts for 67% of the global polyurethane consumption. Its pollution caused by random disposal is more serious due to its low density and large volume. (Thesis: Green and sustainable polyurethanes for advanced Applications and Polyurethane foams: past, present, and future). The recycling of polyurethane foam has become the focus of current sustainable development.

Polyurethane foam is a type of thermosets with a permanent chemical cross-linked network, which cannot be traditionally reprocessed. Polyurethane foam contains a large number of urea bonds, urethane bonds, and ester bonds, which can be reversibly exchanged under certain conditions. Utilizing the reversible properties of urethane bonds, Dichtel et al. introduced dibutyltin dilaurate as a catalyst to realize the reprocessing of polyurethane in a twin-screw extruder (Thesis: Reprocessing postconsumer polyurethane foam using carbamate exchange catalysis and twin-screw extrusion). However, the material will inevitably undergo degradation, resulting in performance reduction, because reprocessing occurs in high temperatures and shear environments. Our group disclosed a polyester/polyurethane recycling method (Patent: CN 111690169A) that can reuse the wastes by adding additives with amino/hydroxyl groups and catalysts. The structure and composition of new materials are different from the original material and the performance is better. However, this type of method requires the addition of large molecule or small molecule reactive additives.

The polyurethane foam can also be chemically decomposed into monomers or oligomers using methods such as ammonolysis and alcoholysis (patent: CN107955206A). This type of method uses small molecular alcohol or ammonia as degrading agents and utilizes the dissociation of urethane bonds or ester bonds to produce small molecules or oligomers. After separation and purification, the recycled product can be used as a raw material. However, this type of method has a long reaction time, low recycle efficiency, high cost, high energy consumption, and low value-added. For instance, alcoholysis, which is the most reported, usually requires several hours of thermal treatment at a high temperature of 160-250° C. In addition, its recycled products are usually similar products with low added value. These factors make it impossible to promote this method on a large scale. The present invention develops a method for recycling with low energy consumption, low cost, and high efficiency. The regenerated product is a high value-added photocurable resin, which is expected to be used in photocurable coatings and 3D printing. The price of photocurable resin is ten or even hundreds of times that of original polyurethane foam, so the present invention has extremely high economic value.

SUMMARY OF THE INVENTION

The present invention provides a method for recycling and reusing polyurethane foam. This method has a fast reaction time, easy recovery of solvent and catalyst, higher value-added recycled product, good economic benefits, and social value.

The technical solution of the present invention is as follows.

(1) The functionalized oligomers are obtained by adding solvent and catalyst to the polyurethane foam.

(2) The functionalized oligomers are chemically modified, and the photosensitive group is introduced through the functional group reaction. The diluent, photoinitiator, and light absorber, etc. are introduced into the obtained oligomers to prepare photocurable resin.

Preferably, the solvent includes, but is not limited to, formamide, dimethylformamide, dimethylacetamide, dimethylsulfoxide, trifluoroacetic acid, acetonitrile, hexamethylphosphoramide, alcohol, pyridine, furan, chloroform, toluene, tetramethylethylenediamine, N-methylpyrrolidone.

Preferably, the catalyst includes one or more guanidines, amidines, tins, amines, etc.

More preferably, the guanidine catalyst includes tetramethylguanidine, 1,5,7-triazidebicyclo(4.4.0)dec-5-ene, 2-tert-butyl-1,1,3,3-tetramethyl guanidi, 7-methyl-1,5,7-triazabis[4.4.0]dec-5-ene, etc. Amidine catalysts include 1,8-diazabicycloundec-7-ene, 1,5-Diazabicyclo[4.3.0]non-5-ene, etc. Tin catalysts include dibutyltin dilaurate, stannous octoate, etc. Amine catalysts include triethylamine, bisdimethylaminoethyl ether, etc.

It should be pointed out that the catalyst, solvent, or the inherent water in the material can react with the urea bond, urethane bond, or ester bond in the foam. The solvent can promote the recycling of the foam, and can also react with urea bonds, urethane bonds, or ester bonds in the foam to obtain oligomers with functional groups.

Preferably, the functional groups include, but are not limited to, hydroxyl groups, amino groups, aldehyde groups, amidine bonds, isocyanate groups. The structure of the oligomer can be linear, branched, or hyperbranched macromolecules.

Preferably, the content of the solvent is 0.1-50 times of the foam. The content of the catalyst is 0.01-50 wt % of the foam. The reaction temperature is 25-180° C. The reaction time is 1 min-10 hours.

More preferably, dimethylformamide (DMF) is used as the solvent, and 1,5,7-triazidebicyclo(4.4.0)dec-5-ene is used as the catalyst (TBD). The urea bond reacts in the system to generate amino groups, isocyanate group, amidine bond, etc. (as shown in reaction formula I).

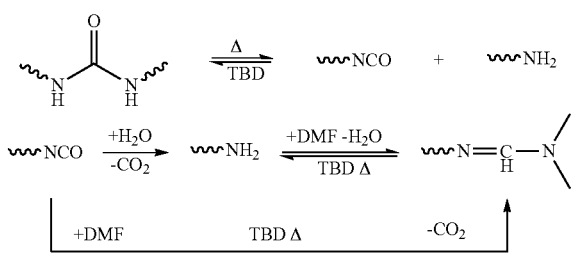

Formula I

More preferably, dimethylformamide (DMF) is used as the solvent, 1,5,7-triazidebicyclo(4.4.0)dec-5-ene is used as the catalyst (TBD), and the urethane bond in the system is reacted to form an amino group, hydroxyl group, amidine bond, isocyanate group, etc. (as shown in reaction formula II).

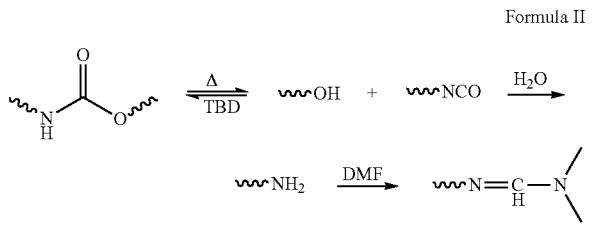

Formula II

More preferably, dimethylformamide (DMF) is used as a solvent, and 1,5,7-triazidebicyclo(4.4.0)dec-5-ene is used as a catalyst (TBD). The ester bond in the system generates hydroxyl group, carboxyl group, etc. (as shown in reaction formula III).

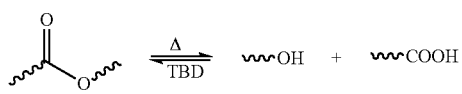

Formula III

It should be pointed out that, the solvent and catalyst can be separated by decompressing distillation, absorption, condensation, adsorption, membrane separation, and other methods to realize the recycling of solvent and catalyst.

Preferably, the photosensitive group is grafted through the reaction of functional groups.

More preferably, the reaction of functional groups includes, but is not limited to, the Michael addition reaction of amino-double bond, amino-epoxy reaction, amino/hydroxy-isocyanate reaction, esterification reaction, or hydrosilylation reaction.

More preferably, the photosensitive group includes, but is not limited to, acrylate/methacrylate, vinyl, thiol, allyl, and epoxy groups.

Preferably, monomer diluent, photoinitiator, and light absorber are added to the products to form photocurable resins. The properties of the photocurable resins can be adjusted by adding the type and content of additives.

More preferably, the monomer diluent includes monofunctional monomers, such as cyclotrimethylolpropane methylal acrylate, ethoxyethoxyethyl acrylate, acryloyl morpholine, (methyl) isobornyl acrylate, tetrahydrofuran acrylate, hydroxyethyl (meth)acrylate, lauryl (meth)acrylate, 2-phenoxyethyl acrylate, isodecyl (meth)acrylate.

More preferably, the monomer diluent includes low-viscosity multifunctional crosslinking agents, such as tripropylene glycol diacrylate, 3-ethoxylated trimethylolpropane triacrylate, ethoxylated pentaerythritol tetra-acrylate, 1,6-hexanediol diacrylate, propylene oxide neopentyl glycol diacrylate, bisphenol A diacrylate, polyethylene glycol acrylate.

More preferably, the photoinitiator that can efficiently absorb the light from near-ultraviolet to visible light range from 385 to 405 nm, including Irgacure 819, Irgacure TPO, isopropyl thioxanthone, 4-dimethylamino-ethyl benzoate, etc.

More preferably, the photoinitiator that can efficiently absorb in the shorter ultraviolet wavelength range from 200 to 385 nm, including benzoin dimethyl ether, benzophenone, Irgacure 184, Irgacure 1173, etc.

More preferably, the light absorber includes Eosin Y, Methyl red, Sudan red, Sudan black B, Phthalocyanine red, Phthalocyanine blue, Golden red, etc.

Preferably, the photocurable resin can be used as photocurable coatings or 3D printing resins. The content of recycled polyurethane foam accounts for 50% to 90% of the photocurable resin.

More preferably, 3D printing includes, but is not limited to, stereolithography apparatus (SLA), inkjet printing, digital light processing (DLP), and liquid crystal display (LCD).

Compared with existing technics, the benefits of the present invention are:

(1) The present invention is suitable for all kinds of polyurethane foam, with various recycling methods, low temperature, short time, high efficiency, and simple equipment requirements.

(2) The properties of the recycled photocurable resins are easy to adjust and have higher added value than raw materials.

DETAILED DESCRIPTION OF THE INVENTION

Figure 1:
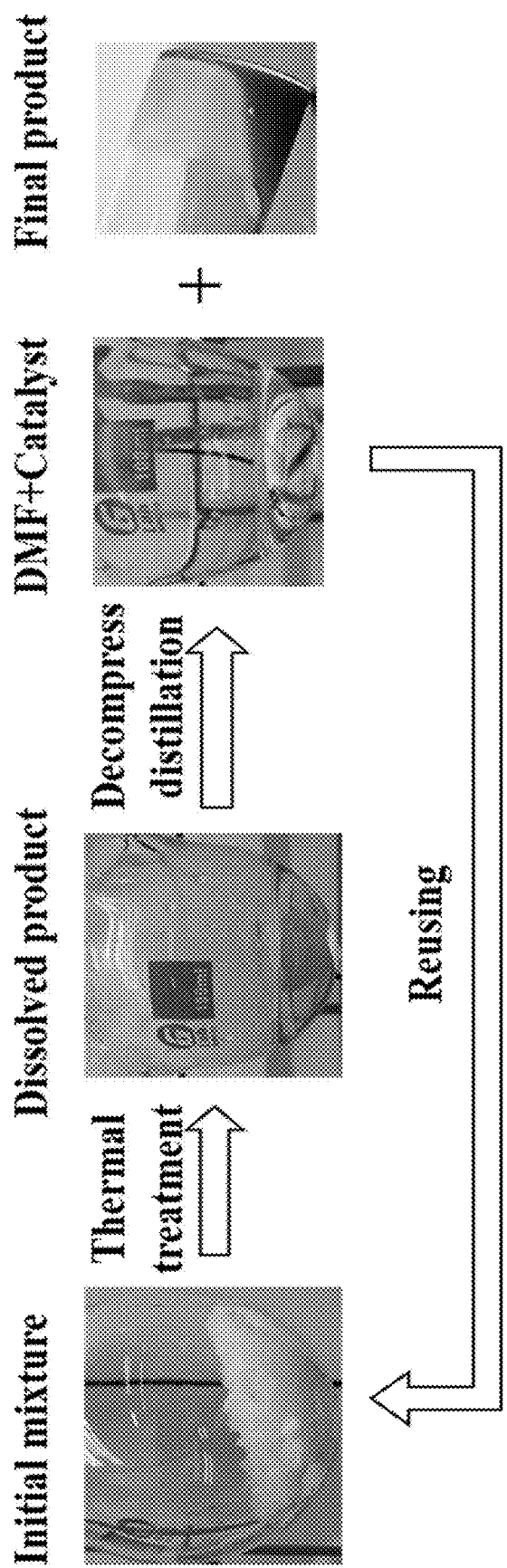
FIG. 1 is a schematic diagram of recycling in Example 1.
Figure 2:
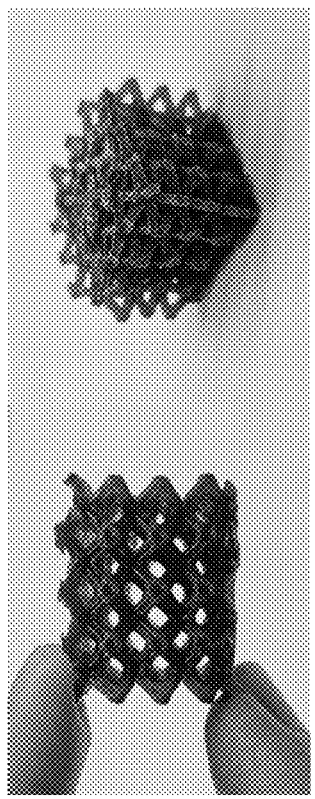
FIG. 2 shows the product obtained by 3D printing in Example 1.

The present invention will be further described in detail with the examples below. It should be noted that the examples described below are intended to help understand the details of this invention. And the method should not be limited to these examples.

Example 1 (Use TBD/DMF to Recycle High-Resilience 35-Density Polyurethane Foam for 3D Printing)

Raw Material:
High resilience 35-density polyurethane foam, Yongyi Company; N,N-Dimethylformamide (DMF), Sinopharm; Dimethyl Sulfoxide (DMSO), Sinopharm; 1,5,7-Triazide Bicyclic (4.4.0) Dec-5-ene (TBD), TCI; Isocyanate Ethyl Acrylate, TCI; Dibutyltin Dilaurate, TCI; 2-Phenoxyethyl Acrylate, TCI; Photoinitiator 819, TCI.

Recycling of Polyurethane:
5 g of polyurethane foam was weighed and pulverized with a pulverizer. 0.15 g of TBD and 50 ml of DMF were added to the polyurethane foam. After mixing uniformly, thermal treatment was conducted at 120° C. for 5 minutes to break the cross-linked network and obtain a uniform transparent solution. The DMF was recycled after vacuum distilling at 120° C. for 10 minutes. The oligomers terminated with amine groups and hydroxyl groups were obtained. The content of functional groups was determined by NMR (Nuclear Magnetic Resonance) spectroscopy and titration.

Preparation of Photocurable Resin:

3 times of DMSO was added to the above product to obtain a yellow solution. After Adding equimolar isocyanate ethyl acrylate, the reaction was conducted at room temperature for 4 hours and a followed 2 hours after the addition of dibutyltin dilaurate catalyst. The solvent DMSO was removed by rotary evaporation. Subsequently, the product was compounded with 2-phenoxyethyl acrylate at a mass ratio of 4:1, and 3 wt % of photoinitiator 819 was added to obtain a photocurable resin.

3D Printing and Characterization:

DLP (Digital Light Processing) was used as the light source to print out a sample that meets the ASTM (American Society for Testing and Materials) D412 standard and tested the mechanical properties in a universal testing machine. The material's modulus was 10 MPa, the strain at break was 50%, and the breaking strength was 10 MPa.

Example 2 (Utilize DBU/DMF to Recycle High-Resilience 35-Density Polyurethane Foam for 3D Printing)

Raw Material:

High resilience 35 density polyurethane foam, Yongyi Company; N,N-Dimethylformamide (DMF), Sinopharm; 1,8-Diazabicycloundec-7-ene (DBU), TCI; Imidazole, Sinopharm; Epoxy resin, Baling Petrochemical; Isobornyl acrylate, TCI; Photoinitiator 819, TCI.

Recycling of Polyurethane:

5 g of polyurethane foam was weighed and pulverized with a pulverizer. 1.5 g of DBU and 50 ml of DMF were added to the polyurethane foam. After mixing uniformly, thermal treatment was conducted at 120° C. for 10 minutes to break the cross-linked network and obtain a uniform transparent solution. The DMF and DBU were recycled after vacuum distilling at 120° C. for 10 minutes. The oligomers terminated with amine groups and hydroxyl groups were obtained. The content of functional groups was determined by NMR spectroscopy and titration.

Preparation of Photocurable Resin:

3 times of DMF was added to the above product to obtain a yellow solution. After adding two molar equivalents of epoxy resin and 0.5 wt % of imidazole catalyst, the reaction was conducted at 160° C. for 4 hours. The solvent DMF was removed by rotary evaporation. Subsequently, the product was compounded with isobornyl acrylate at a mass ratio of 6:1, and 3 wt % of photoinitiator 819 was added to obtain a photocurable resin.

3D Printing and Characterization:

SLA (Stereolithography Appearance) was used as the light source to print out a sample that meets the ASTM D412 standard and tested the mechanical properties in a universal testing machine. The material's modulus was 500 MPa, the strain at break was 40%, and the breaking strength was 30 MPa.

Example 3 (Use DBTDL/DMF to Recycle High-Resilience 35-Density Polyurethane Foam for Coating)

Raw Material:

High resilience 35-density polyurethane foam, Yongyi Company; N,N-Dimethylformamide (DMF), Sinopharm; Dibutyltin Dilaurate (DBTDL), TCI; Acrylic Isocyanate, TCI; Benzoin Dimethyl Ether (DMPA), TCI; Eosin Y, Anaiji company.

Recycling of Polyurethane:

5 g of polyurethane foam was weighed and pulverized with a pulverizer. 0.1 g of DBTDL and 50 ml of DMF were added to the polyurethane foam. After mixing uniformly, thermal treatment was conducted at 150° C. for 1 hour to break the cross-linked network and obtain a uniform transparent solution. The DMF was recycled after vacuum distilling at 120° C. for 10 minutes. The oligomers terminated with amine groups and hydroxyl groups were obtained. The content of functional groups was determined by NMR spectroscopy and titration.

Preparation of Photocurable Resin:

3 times of DMF was added to the above product to obtain a yellow solution. After Adding two molar equivalents of acrylic isocyanate, the reaction was conducted at 80° C. for 2 hours. The solvent DMF was removed by rotary evaporation. Subsequently, 1% of DMPA and Eosin Y was added to obtain a red photocurable resin.

Photocurable Coating:

The photocurable resin was spin-coated on the glass substrate, and a 200 nm ultraviolet light source was used for light polymerization to obtain a polymer coating.

Example 4 (Use TMG/DMF to Recycle Ordinary 35-Density Polyurethane Foam for Coating)

Raw Material:

Ordinary 35-density polyurethane foam, Yongyi Company; N,N-Dimethylformamide (DMF), Sinopharm; Tetramethylguanidine (TMG), TCI; Acrylic Isocyanate, TCI; Photoinitiator 819, TCI.

Recycling of Polyurethane:

5 g of polyurethane foam was weighed and pulverized with a pulverizer. 5 g of TMG and 50 ml of DMF were added to the polyurethane foam. After mixing uniformly, thermal treatment was conducted at 120° C. for 20 minutes to break the cross-linked network and obtain a uniform transparent solution. The DMF and TMG were recycled after vacuum distilling at 120° C. for 10 minutes. The oligomers terminated with amine groups and hydroxyl groups were obtained. The content of functional groups was determined by NMR spectroscopy and titration.

Preparation of Photocurable Resin:

3 times of DMF was added to the above product to obtain a yellow solution. After Adding two molar equivalents of acrylic isocyanate, the reaction was conducted at 80° C. for 2 hours. The solvent DMF was removed by rotary evaporation. Subsequently, 1% of photoinitiator 819 was added to obtain a photocurable resin.

Photocurable Coating:

The photocurable resin was spin-coated on the glass substrate, and the visible light source was used for light polymerization to obtain a polymer coating.

Example 5 (Use TBD/DMF to Recycle Shaped Cotton 60-Density Polyurethane Foam for 3D Printing)

Raw Material:

Shaped cotton 60-density polyurethane foam, Yongyi Company; N,N-Dimethylformamide (DMF), Sinopharm; 1,5,7-Triazidebicyclo(4.4.0)dec-5-ene (TBD), TCI; Acrylic Isocyanate, TCI; Photoinitiator 819, TCI.

Recycling of Polyurethane:

5 g of polyurethane foam was weighed and pulverized with a pulverizer. 0.15 g of TBD and 50 ml of DMF were added to the polyurethane foam. After mixing uniformly, thermal treatment was conducted at 120° C. for 15 minutes to break the cross-linked network and obtain a uniform transparent solution. The DMF was recycled after vacuum distilling at 120° C. for 10 minutes. The oligomers terminated with amine groups and hydroxyl groups were obtained. The content of functional groups was determined by NMR spectroscopy and titration.

Preparation of Photocurable Resin:

Two molar equivalents of acrylic isocyanate were added to the above product and reacted at 80° C. for 2 hours. Subsequently, 1% photoinitiator 819 was added to obtain a high-viscosity photocurable resin.

3D Printing and Characterization:

Inject printing was used to extrude a sample that meets the ASTM D412 standard and was cured by visible light. The mechanical properties were tested in a universal testing machine. The material's modulus was 50 MPa, the strain at break was 200%, and the breaking strength was 50 MPa.

What is claimed is:

1. A method for recycling and reusing polyurethane foam comprising the following steps:
   (1) obtaining functionalized oligomers by adding a solvent and a catalyst to the polyurethane foam; and
   (2) chemically modifying the functionalized oligomers, introducing a photosensitive group through the functional group reaction, and introducing a diluent, a photoinitiator, and a light absorber into the obtained oligomers to prepare photocurable resin.

2. The method of claim 1, wherein the solvent is selected from the group consisting of formamide, dimethylformamide, dimethylacetamide, trifluoroacetic acid, acetonitrile, dimethylsulfoxide, hexamethylphosphoramide, alcohol, pyridine, furan, chloroform, toluene, tetramethylethylenediamine, and N-methylpyrrolidone; and the catalyst is selected from the group consisting of guanidines, amidines, tins, and amines.

3. The method of claim 2, wherein the guanidines is selected from the group consisting of tetramethylguanidine, 1,5,7-triazidebicyclo(4.4.0)dec-5-ene, 2-tert-butyl-1,1,3,3-tetramethyl guanidi, and 7-methyl-1,5,7-triazabis[4.4.0]dec-5-ene; the amidines is selected from the group consisting of 1,8-diazabicycloundec-7-ene, and 1,5-diazabicyclo[4.3.0]non-5-ene; the tins is selected from the group consisting of dibutyltin dilaurate, and stannous octoate; and the amines is selected from the group consisting of triethylamine and bisdimethylaminoethyl ether.

4. The method of claim 1, wherein the functional groups of the oligomers in step (1) are selected from the group consisting of hydroxyl groups, amino groups, aldehyde groups, amidine bonds, and isocyanate groups.

5. The method of claim 1, wherein the content of the solvent is 0.1-50 times of the foam; the content of the catalyst is 0.01-50 wt % of the foam; the reaction temperature is 25-180° C. and the reaction time is 1 min-10 hours.

6. The method of claim 1, wherein the solvent and catalyst in step (1) are separated and recycled.

7. The method of claim 1, wherein the photosensitive group in step (2) is selected from the group consisting of acrylate/methacrylate, vinyl, thiol, allyl, and epoxy group.

8. The method of claim 1, wherein in step (2), the monomer diluent is monofunctional monomers and low-viscosity multifunctional crosslinking agents; the photoinitiator is a visible light initiator or an ultraviolet light initiator; the light absorber is a dye.

9. The method of claim 1, wherein the content of recycled polyurethane foam accounts for 50% to 90% of the photocurable resin.

10. The method of claim 1, wherein the photocurable resin is used as photocurable coatings or 3D printing resins.

* * * * *